United States Patent [19]

Enders

[11] Patent Number: 4,584,038

[45] Date of Patent: Apr. 22, 1986

[54] TIRE BUILDING METHOD

[75] Inventor: George E. Enders, Salem, Ohio

[73] Assignee: NRM Corporation, Columbiana, Ohio

[21] Appl. No.: 570,650

[22] Filed: Jan. 13, 1984

[51] Int. Cl.$^4$ .......................... B29D 30/32; B29D 30/24
[52] U.S. Cl. ..................................... 156/132; 156/133; 156/401; 156/403; 156/417; 264/315
[58] Field of Search .................................. 156/131–134, 156/123, 124, 126, 128.1, 401, 403, 400, 414–420, 421.8; 152/354 R, 356 R, 548, 552; 264/241, 257, 258, 296, 315, 326

[56] References Cited

U.S. PATENT DOCUMENTS

| | | | |
|---|---|---|---|
| 3,078,204 | 2/1963 | Appleby | 156/132 |
| 3,268,382 | 8/1966 | Urbon | 156/401 |
| 3,433,695 | 3/1969 | Caretta et al. | 156/401 |
| 3,434,897 | 3/1969 | Caretta et al. | 156/132 |
| 3,438,832 | 4/1969 | Cantarutti | 156/132 X |
| 3,582,435 | 6/1971 | Frazier | 156/401 |
| 3,645,818 | 2/1972 | Frazier | 156/128 |
| 3,713,950 | 1/1973 | Beal | 156/401 |
| 3,721,600 | 3/1973 | Cantarutti | 156/401 |
| 3,740,293 | 6/1973 | Jones et al. | 156/415 |
| 3,776,802 | 12/1973 | Mallory et al. | 156/420 |
| 3,784,426 | 1/1974 | Woodhall et al. | 156/132 |
| 3,784,437 | 1/1974 | Appleby et al. | 156/401 |
| 3,944,456 | 3/1976 | Cantarutti | 156/398 |
| 4,072,550 | 2/1978 | Stalter, Jr. | 156/123 R |
| 4,302,274 | 11/1981 | Enders | 156/132 X |
| 4,343,671 | 8/1982 | Enders | 156/401 |
| 4,353,771 | 10/1982 | Yuhas | 156/401 X |

Primary Examiner—Edward Kimlin
Assistant Examiner—Thomas Bokan
Attorney, Agent, or Firm—Renner, Otto, Boisselle & Lyon

[57] ABSTRACT

A tire building machine and method employing a tire building drum for receiving at least one ply of tire material having an edge overhanging an axial end of the drum, a bladder turn-up mechanism extending axially outwardly from the drum, an annular array of radially contractible ply-down fingers movable axially to and from a position encircling the overhanging ply edge, and an axially movable ring device operative first to effect radial contraction of the ply-down fingers to turn the ply edge down over the end of the drum, then to set a tire bead against the turned down ply edge at the end of the drum, and then to push the bladder of the turn-up mechanism when inflated to cause the ply edge to be progressively wrapped around the bead and then over the drum. In addition to a bead setting ring and a ply-down finger camming ring, the ring mechanism includes a contoured bladder control ring operative axially to push and radially to restrain the bladder, developed pressure in the bladder being reduced after contact is made with the control ring and then held at reduced pressure to allow the control ring to force the bladder to wrap around the bead and roll over the drum thereby to continue progressive wrapping of the ply edge around the bead and then over the drum with a bulge in the bladder forming in front of the axially inwardly moving control ring. Thereafter, the pressure in the bladder is further reduced, particularly in the case of long ply locks, to continue rolling of the bladder at the bulged portion to provide maximum ply lock with relatively low pressure sustained in the bladder. Finally, the bladder is reinflated while simultaneously retracting the control ring.

11 Claims, 10 Drawing Figures

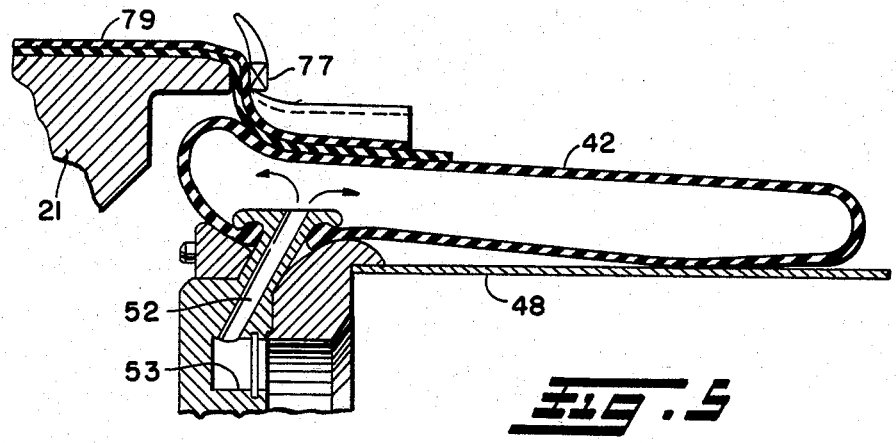
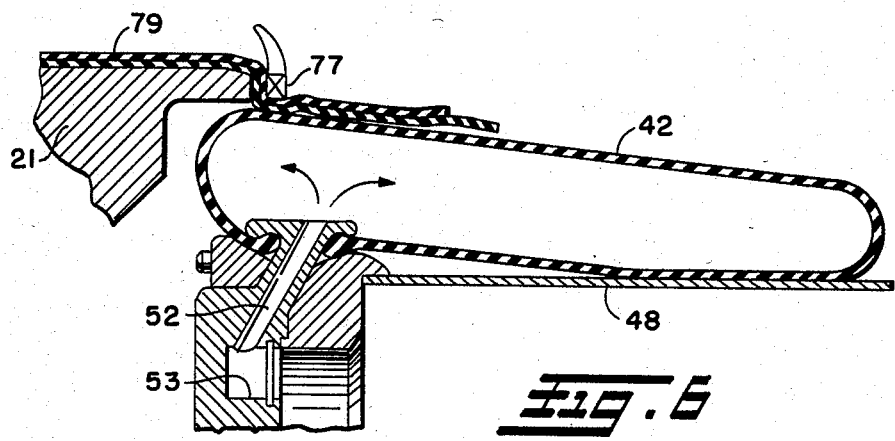
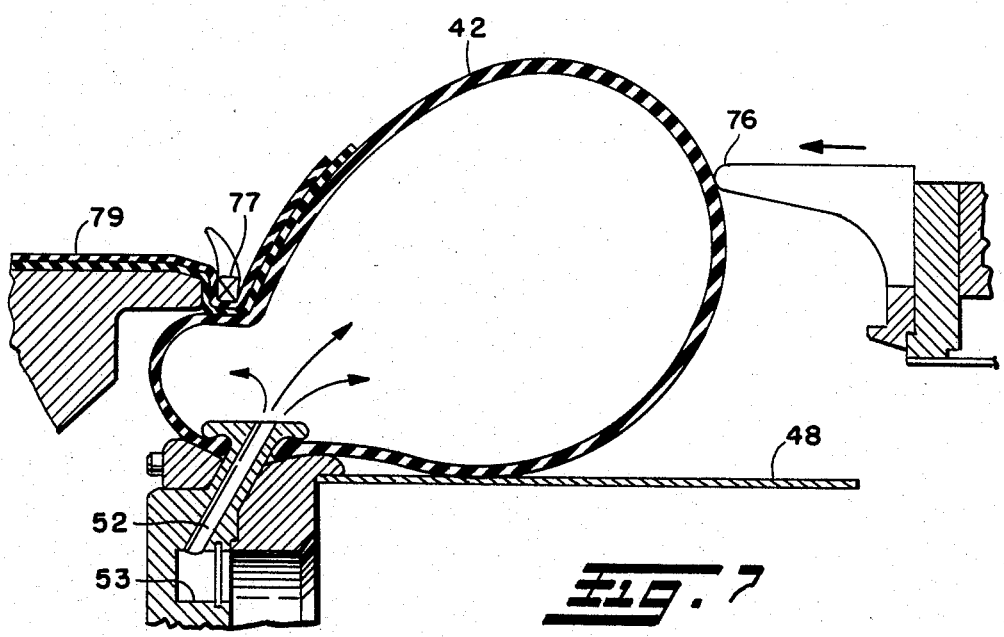

TIRE BUILDING METHOD

DISCLOSURE

This invention relates generally to tire building machines and methods and more particularly to an improved tire building machine and method employing a ply turn-down, bead setter and ply turn-up mechanism in operative association with each axial end of a tire building drum.

BACKGROUND

In the manufacture of tires, it is conventional practice to apply one or more tire plies in cylindrical form on a tire building drum with the edges of the plies extending axially beyond the ends of the drum, then to position inextensible tire beads at the ends of the drum, and thereafter to turn up the ply edges and stitch the same around the beads and onto the outer surface of the tire ply material surrounding the drum. Although most if not all presently used first or single stage tire building machines and methods share this common practice, such machines and methods nonetheless differ in many respects.

Many tire building machines and methods presently in use employ ply turn-up mechanisms incorporating one or two expandable bladders. When brought into proper position at the end of the tire building drum and inflated, the bladder or bladders cause a previously turned down ply edge to be turned about a previously set bead at the end of the drum. As is typical of these machines and methods, the bead is set in place by an axially movable bead setting device which may also operate to contract an annular array of ply-down fingers when the latter are positioned around the ply edge. As the bead setting device moves axially toward the drum, the fingers are pivoted inwardly to turn the ply edge down over the end of the drum to provide a shoulder of ply material against which the tire bead is pressed into place. For an example of one such tire building machine and method, reference may be had to Cantarutti U.S. Pat. No. 3,438,832. As disclosed in such patent, the ply-down fingers when in an axially retracted position may provide a reaction surface operative to cause one inflated bladder to force another inflated bladder to wrap around the end of the drum.

In other tire building machines and methods, a single turn-up bladder has been employed in cooperation with a bladder pusher to effect ply edge turn-up and wrapping. Typically, the bladder pusher is in the form of a ring mounted along with a bead setting device on a carriage which actually moves to and from the drum. The carriage first moves towards the drum to set a bead carried by the bead setting device in proper position, then retracts to permit expansion of the turn-up bladder, and then again moves toward the drum to engage and push the bladder over the end of the drum. Heretofore, such bladder pushers/bead setters have been used with tire building drums which radially expand after application of ply material either to form a shoulder of ply material at the end of the drum for bead placement thereagainst or to lock in place a bead positioned by the bead setting device radially over the ply material inwardly adjacent the end of the drum. For an example of the former, reference may be had to Appleby U.S. Pat. No. 3,078,204, whereas an example of the latter can be seen in applicant's U.S. Pat. No. 4,343,671 which also shows alternative usage of a dual bladder turn-up assembly.

Notwithstanding the advances that have been made in the tire building art, some of which are noted above, there still remains room for improvement. Among existing needs are tighter wrapping of the ply material about the tire beads especially when long and hard durometer bead fillers are involved; compact wrapping with less air entrapment; less maintenance; reduction of electrical and fluid power hardware and controls; reduction of the amount of bladder expansion and pressure while providing a tight wrap; reduction of required cycle time; and uniformity of application to tires of both biased and radial ply constructions.

SUMMARY OF THE INVENTION

To the achievement of the foregoing and other objects, the present invention provides a method a tightly wrapping the edge of tire ply material around a tire bead placed at the end of a tire building drum against the ply edge which extends axially beyond the drum end. Such method is characterized by the steps of inflating to full or set pressure an annular bladder initially lying generally flat with its axially inner edge adjacent the drum end progressively to wrap and turn upwardly the ply edge around the tire bead; then axially inwardly pushing a portion of the bladder by an axially inwardly advancing bladder control ring, developed bladder pressure being reduced after contact is made and then held at reduced pressure to allow the control ring to force the bladder progressively to wrap around the bead and roll over the drum thereby to continue progressive wrapping of the ply edge around the bead and over the drum, such control ring having an annular radial pusher surface terminating in a generally axially extending, cylindrical surface operative to rigidly radially constrain the bladder over a portion thereof overlying the bead and drum and behind a radially outwardly bulged, axially inner end portion of the thusly rolled bladder; and then further reducing the pressure in the bladder to continue rolling of the bladder at the bulged portion to provide maximum ply lock with relatively low pressure sustained in the bladder. Thereafter, the bladder is reinflated to pull the bladder away from the terminal end of the ply edge as by temporarily reestablishing the bulge while simultaneously retracting the control ring. As well be appreciated, a tight wrap may be obtained, even with beads having long and hard durometer fillers, without overstressing and stretching of the bladder and resultant in bladder life.

Further in accordance with the method of the invention, a multifunctional ring device incorporating the above indicated bladder control ring is utilized in various modes to effect not only the aforementioned bladder manipulation but also bead setting and ply-down functions. According to the invention, the ply edge extending axially beyond the drum may be folded down over the end or shoulder of the drum by a spring finger ply-down assembly which is moved axially inwardly to surround the ply edge and then actuated by axial inward movement of the ring device. The ring device also includes a bead setting ring which operates to hold and then place the bead against the down-turned ply edge at the shoulder of the drum. Thereafter, the ring device is retracted to clear the bladder and then again indexed axially inwardly after full inflation of the bladder to engage the control ring with the inflated bladder as described above and hereinafter in detail. As will be seen, the axially inner edge of the bladder preferably is positioned to radially underlie the drum shoulder prior to inflation. As the bladder inflates to full or set pressure, the ply edge is progressively wrapped around the underside of the bead and turned upwardly. As the bladder is pushed axially inwardly by the control ring after having been brought to reduced pressure, the bladder continues to roll over the bead progressively to wrap the ply edge around the bead.

The present invention also provides a tire building machine for carrying out the method of the invention. Briefly, the machine comprises a tire building drum for receiving one or more plies of tire material having an edge overhanging an axial end (usually both ends) of the drum, a bladder turn-up mechanism extending axially outwardly from the drum, an annular array of radially contractible ply-down fingers movable axially to and from a position surrounding the overhanging ply edge, and an axially movable ring device operative first to effect radial contraction of the ply-down fingers to turn the ply edge down over the end of the drum, then to set a bead against the turned down ply edge at the end of the drum, and then to push the bladder of the turn-up mechanism when inflated to cause the ply edge to be progressively and tightly wrapped around the bead and over the drum. The ring device includes the aforementioned bladder control ring which may consist of a plurality of annularly arranged, radially adjustable sectors.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIGS. 2–10 are fragmentary longitudinal sections similar to FIG. 1 but illustrating the preferred sequence of operation of the tire building machine of the present during the manufacture of a tire ply band.

DETAILED DESCRIPTION

Figure 1:
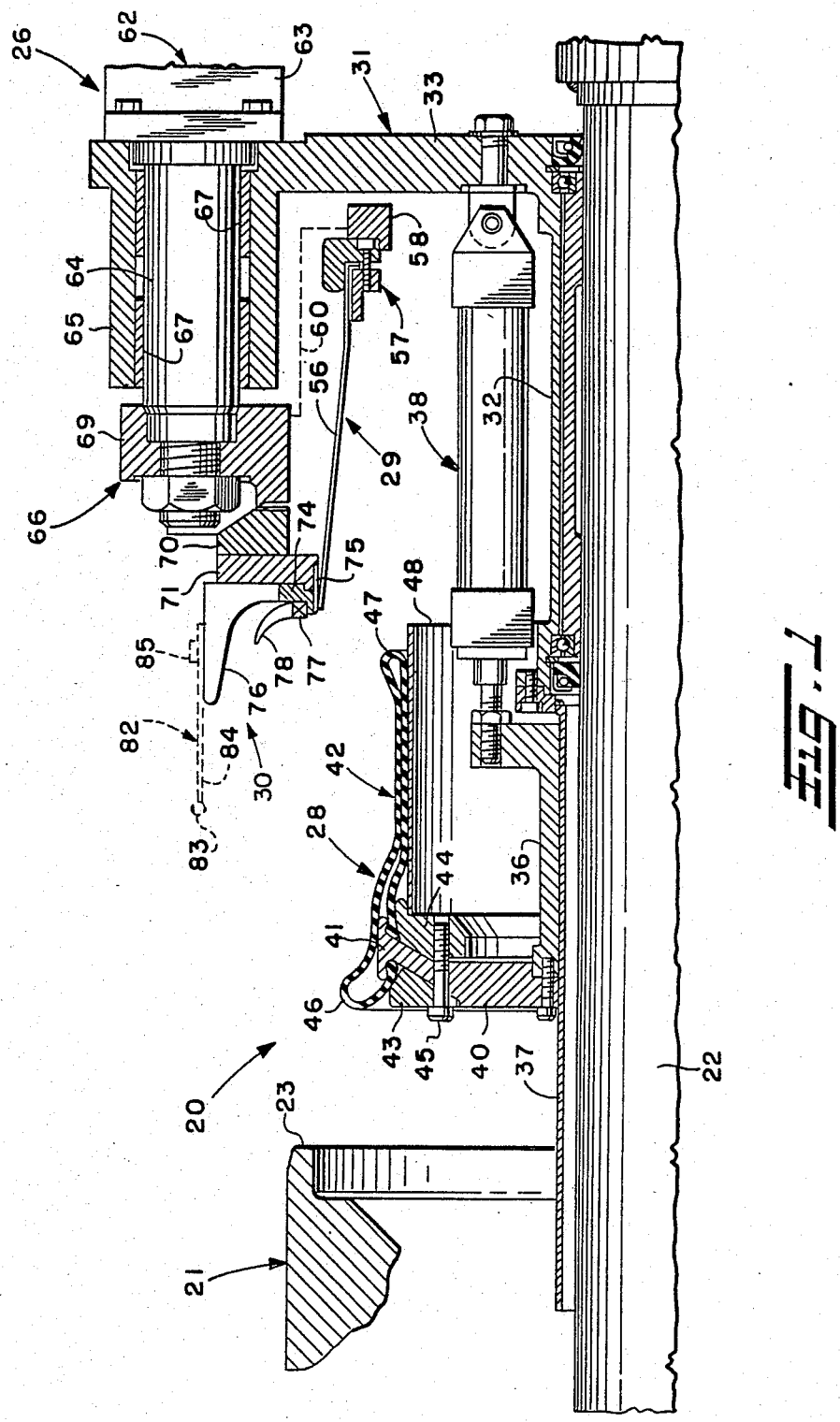
FIG. 1 is a fragmentary longitudinal section through a tire building machine according to the present invention.

Referring now in detail to the drawings and initially to FIG. 1, there is illustrated generally at 20 a portion of a preferred form of tire building machine according to the present invention which may be used in the manufacture of conventional passenger or truck tires. The machine illustrated is operative as a first stage machine to construct tire ply bands which may later be shaped to a toroid or tire shape on a second stage machine where other tire components such as belts and/or treads are assembled. It however will be appreciated that the present invention may be utilized with other types of tire building machines such as a single stage machine wherein the tire ply band is both constructed and shaped.

The tire building machine 20 includes a tire building drum 21 mounted on a drum shaft 22 which may be conventionally supported and rotatably driven by suitable means. The drum 21 may of conventional radially expandable type with suitable mechanisms being provided first to expand the drum to an enlarged cylindrical configuration for proper placement of one or more tire plies thereon and later to contract the drum to permit removal of a finished tire ply band. Each axial end of the drum may be provided with an axially outwardly extending, circumferential shoulder as seen at 23. In some applications, the drum may be expanded after application of the tire plies.

The tire building machine 20 also includes an inboard assembly 26 mounted adjacent one end of the tire building drum 21. Although not shown, the tire building machine also includes an outboard assembly at the opposite end of the drum. Only the inboard assembly 26 is shown and described hereinafter in detail inasmuch as the outboard assembly is substantially identical in construction and operation to the inboard assembly. It is noted however that the outboard assembly as a unit or components thereof may be mounted for axial separation from the drum shaft 22 to permit removal of a finished tire ply band from the drum as well as placement of tire beads in the inboard and outboard assemblies prior to formation of another tire ply band.

The inboard assembly 26 comprises a bladder ply turn-up mechanism 28, a spring finger ply-down assembly 29 and a multi-functional ring device 30. Such components are commonly supported for independent axial movement on an annular support mounted on and concentric with the drum shaft 22. As shown, the support 31 has an axially elongate hub 32 bearingmounted on the drum shaft 22 and an annular mounting flange 33 extending radially outwardly from the axially outer end of the hub 32. As employed in the illustrated embodiment, the support 31 is fixed against both axial movement and rotation after adjustment for proper shoulder set. Although not shown, suitable hardware may be employed to attach the support 31 to a fixed housing located to the right of FIG. 1 in which a mount and drive for the drum shaft 22 may be housed. It is noted, however, that the support 31 otherwise may be moved axially and even rotated on the drum shaft if desired.

The bladder ply turn-up mechanism 28 is mounted on the support 31 for axial movement towards and away from the tire building drum 21 by an annular shuttle 36 and a cylindrical shaft sleeve 37. The shuttle 36 is slidably received on the shaft sleeve 37 which is connected to the support hub 32 at the axially inner end of the latter. Axial movement of the shuttle 36 is obtained by actuation of an axially extending piston-cylinder assembly 38 which is connected between the shuttle 36 and the mounting flange 33 of the support 31. By actuating the assembly 38, the shuttle 36 may be moved axially toward and away from the drum as required during the tire building operation.

At its axially inner end (to the left in FIG. 1), the shuttle 36 has attached thereto a radially extending plate 40 of the ply turn-up mechanism 28. The plate 40 has an annular radial projection 41 of generally T-shape cross section, the stem of which extends slightly axially outwardly (to the right in FIG. 1) as well as radially outwardly. The flanges of the T-shape projection 41 extend axially in opposite directions and terminate at radially inwardly projecting terminal ends which define annular grooves in which are received the beads of an annular folded bladder 42. The axially inner and outer beads of the bladder 42 respectively are retained in the grooves by axially inner and outer wedge rings 43 and 44 which are secured to opposite sides of the radial plate 40 by common fasteners, one being seen at 45. When deflated as seen in FIG. 1, the bladder 42 lies generally flat, having folded or looped portions 46 and 47 at its axially inner and outer circumferential edges, and is supported over substantially its entire length by a cylindrical support can 48 mounted to the axially outer wedge ring 44. As shown, the support can is substantially radially inwardly offset from the outer diameter support surface of the drum when the latter is expanded.

Figure 2:
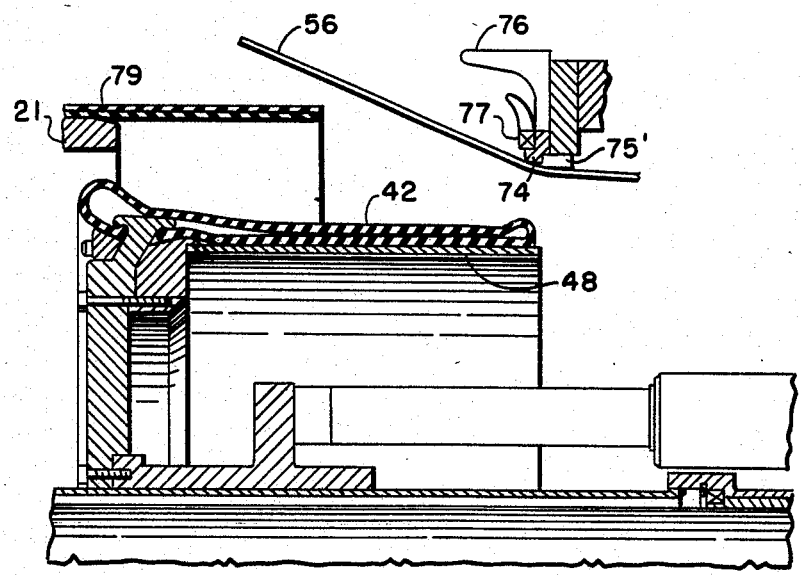
Figure 3:
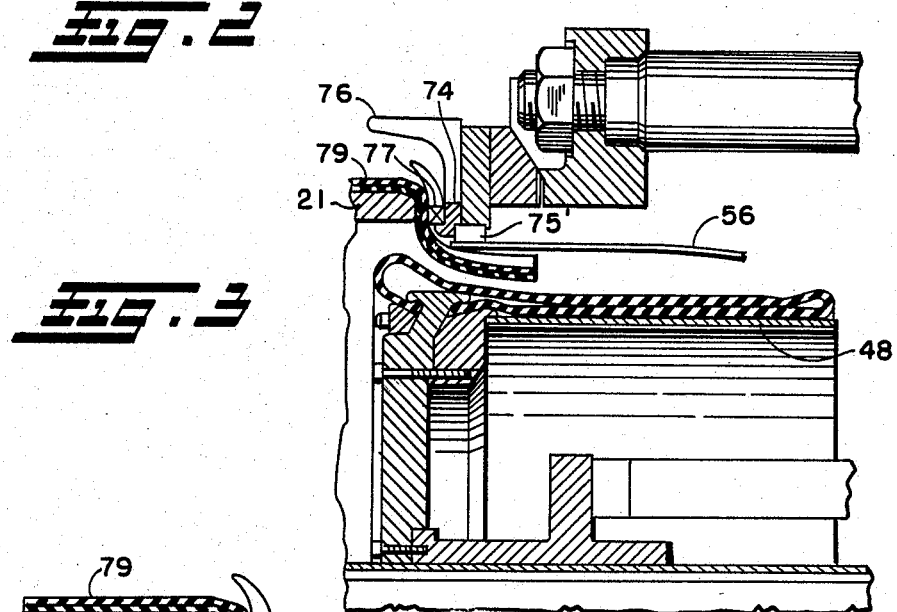
Figure 4:
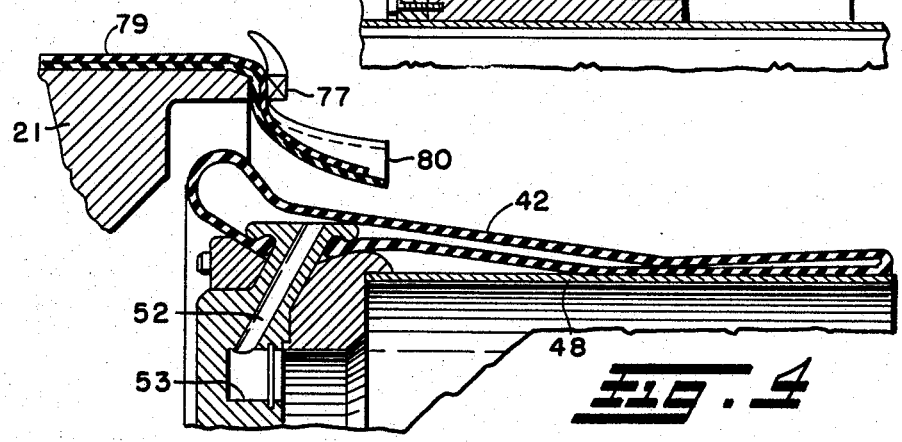

Although the wedge rings 43 and 44 preferably are attached to the radial plate 40 by common fasteners 45, such rings may be otherwise configured and mounted to the radial plate as by separate fasteners as seen in FIGS. 2-4. As further seen in FIG. 4, the radial plate 40 may be provided with air passages, one being seen at 52. The air passages open outwardly to the interior of the bladder 42 and each may be connected at its radially inner end to a respective axial bore 53 configured to receive therein a fitting for coupling thereto of a respective air supply (not shown) of the tire building machine. In a further alternative arrangement, a tubular bladder of the type seen in applicant's U.S. Pat. No. 4,302,274 may be employed in a manner generally similar to that shown in such patent. Such bladder arrangement would advantageously minimize required clamping hardware even beyond the clamping arrangement seen in FIG. 1.

Referring now to the spring finger ply-down assembly 29, such includes an annular array of spring fingers, each of which may be of the type seen at 56 in FIG. 1. Each spring finger projects axially toward the tire building drum 21 and radially outwardly at an angle when in its unflexed condition seen in FIG. 2. At their axially outer ends, the spring fingers are secured by a mounting ring assembly 57 to a support ring 58 which in turn is mounted for axial movement toward and away from the drum. For a detailed discussion of a preferred ring finger mounting arrangement, reference may be had to Yuhas U.S. Pat. No. 4,353,771. As disclosed therein, the spring fingers may be secured between two nested rings which are constructed to interfit with each other and with each finger so that each finger may be inserted or removed without affecting adjacent fingers.

Any suitable means may be employed to mount the support ring 58 for the indicated axial movement. Preferably, the support ring 58 is coaxially mounted for axial movement on the outer mounting ring 69 of the hereinafter described ring mounting assembly 66 as schematically indicated by the broken line 60. For example, the support ring may be mounted to the ring 69 by a bushing and guide rod assembly located at 12 o'clock and a pair of axially extending piston-cylinder assemblies respectively located at 3 and 9 o'clock. Consequently, axial movement of the support ring relative to the mounting assembly 66 may be obtained by actuation of such piston-cylinder assemblies interconnected between such support ring and the mounting ring 69. Thus by actuation of such piston-cylinder assembly, the ply-down assembly 29 may be moved axially toward and away from the tire building drum 21 independently of the mounting assembly 66 to which the ring device 30 is mounted as required during the tire building operation. Also, a suitable adjustable mechanical stop may be provided to limit axial inward movement of the ply-down assembly for proper positioning in relation to the drum 21 in the below described manner.

The multi-functional ring device 30 also is supported on the support 31 for axial movement by a pair of large, diametrically opposed piston-cylinder assemblies, one being seen at 62 in FIG. 1. The cylinder 63 of each assembly 62 is mounted to the outer axial side of the radial flange 33 with the piston rod 64 of each assembly extending axially inwardly through a tubular guide sleeve 65 for connection to a ring mounting assembly 66. The sleeve 65, which may be formed integrally with the radial flange 33 as shown, is provided with bushings 67 which receive and support the piston rod 64 for sliding axial movement upon actuation of the assembly 62.

The ring mounting assembly 66 includes an axially outer mounting ring 69 secured to the piston rod 64 of each assembly 62 and a radially inner mounting ring 70 to which is secured an adaptor ring 71 of the miltifunctional ring device 30. The outer and inner mounting rings 69 and 70 are fastened together by suitable means (not shown) and have mating surface for squaring and concentrically positioning the adaptor ring 71 relative to the axis of the drum shaft 22 or, more importantly, the axis of the tire building drum 21. As will be appreciated, the adaptor ring may be detachably secured to the inner mounting ring 70 for ready removal and replacement of the multi-functional ring device 30 as desired.

The functional components of the ring device 30 are a bead setting ring 74, ply-down camming ring 75 and a bladder control ring 76, which are all fixedly secured to the adaptor ring 71. The bead setting ring 74, which is secured to the axially inner side of the adaptor ring 71, has an axially inwardly extending annular projection adapted to receive and hold a tire bead seen at 77. In addition to a core of circumferentially inextensible wire elements, in some tire constructions the bead may further have a long and hard durometer bead filler 78.

The ply-down camming ring 75 is set is place at the inner diameter of the bead setting ring 74 and adaptor ring 71. As seen in FIG. 1, such ring provides an annular bearing surface at the inner diameter of the ring device 30 for operative engagement with the ply-down fingers 56 in the manner hereinafter described. The ring may be made of any suitable plastic bearing material. The ring also may be relatively thick in radial dimension as seen at 75' in FIGS. 2 and 3 but this normally would require precision machining of the plastic for proper concentric actuation of the ply-down fingers 56. Such precision machining, however, may be eliminate by utilizing a relatively thin ring as seen in FIG. 1. When the fingers are retracted relative to the ring 75, they are held closed by such ring as seen in FIG. 1.

The bladder control ring 76 also is attached to the axially inner side of the adaptor ring 71 but radially outwardly of the bead setting ring 74. The bladder control ring has a contoured bladder pusher surface commencing at a point flush with the axial inner face of the bead setting ring 74 and terminating at a substantially axially extending cylindrical surface having an inner diameter somewhat greater than the outer diameter of the tire building drum when radially expanded. The operative relationship of the contoured bladder control ring to the turn-up bladder 42 and drum 21 will become more clear from the following discussion of the operation of the tire building machine. The control ring may consist of a plurality of annularly arranged sectors fixedly yet radially adjustably secured to the adaptor ring, such allowing radial adjustment of the control ring's pusher surface as needed to obtain optimum bladder control. The control ring also may have secured thereto an axially inwardly projecting extension ring assembly shown in broken lines at 82 in FIG. 1. The extension ring assembly 82 includes an extension ring 83 mounted coaxially with and axially forward of the control ring by axially extending brackets 84 secured at their axially outer ends to the outer diameter of the control ring (or sectors thereof) by fasteners 85. The extension ring provides for extended bladder rolling as may be desired in those applications requiring long such as 9" ply material overhangs. When employed, the extension ring would serve to radially constrain the bladder forwardly of the control ring. As illustrated, the extension ring may have an inner diameter substantially equal to or slightly greater than the maximum inner diameter of the control ring. Of course, the particular dimensions of the extension ring and its extent of projection forwardly of the control ring may vary from application to application. As will be appreciated, such assembly constitutes an inexpensive optional retrofit for obtaining extended bladder rolling.

A preferred operational cycle of the tire building machine 20 will now be described with reference to FIG. 1 and the sequential views of FIGS. 2–10. Although the operational steps will be described with respect to the illustrated components at one end of the drum, the operational sequence is generally applicable to the components at the other end of the drum. As is preferred, operation of like components at each end of the drum may be effected simultaneously by suitable controls.

Initially, the tire building machine 20 may be in the FIG. 1 position. As seen in FIG. 1, the tire bead 77 has already been placed on the bead setting ring 74, this having necessitated radial contraction of the tire building drum 21 to permit telescopic movement of the bead thereover. After the bead has been set in place, the drum can then be radially expanded to its FIG. 1 position. As further shown in FIG. 1, the ply-down assembly 29 is fully retracted such that the spring fingers 56 are held closed in their flexed condition by the plastic ply-down camming ring 75 of the ring device 30. As shown, the spring fingers terminate at a point radially inwardly of the bead setting ring to allow placement of the tire bead on the latter.

After the tire building drum 21 has been radially expanded, the ply turn-up mechanism 28 then may be indexed axially towards the drums into position with the axially inner folded edge 46 of the bladder 42 located radially and axially inwardly of the drum shoulder. One or more plies of tire fabric material 79 may now be applied circumferentially around the drum with a circumferential edge thereof overhanging (extending axially beyond) the end of the drum substantially as shown in FIG. 2. As previously indicated, the fabric material might first be applied and then the drum expanded.

At this time, the ply-down assembly 29 is indexed axially towards the drum and relative to the ring device 30. As the inwardly flexed ends of the spring fingers 56 clear the plastic camming ring 75 in the ring device 30, the fingers will pivotally spring to their full open condition seen in FIG. 2. Once open, further axial inward movement of the ply-down assembly will cause the spring fingers to encircle the overhanging ply edge. In the illustrated embodiment, the ply-down assembly may be part way indexed to open the spring fingers and then the ring device 30 moved axially toward the drum. As the ring device continues to move towards the drum, the spring force of the fingers will cause the same to be carried with the ring device until the ply-down assembly moves into position and is stopped against further inward movement as by an adjustable mechanical stop. Once the ply-down assembly has stopped, inward advancement of the ring device thereover will cause the plastic camming ring therein to cammingly engage and radially inwardly pivot the spring fingers to turn the ply edge over the end of the drum as shown in FIG. 3. At the conclusion of the ply turn down operation, the ring device continues to move axially inwardly to set the bead 77 carried by the bead setting ring 74 firmly against the end of the drum with turned-down ply material interposed between the bead and drum shoulder 23. As will be appreciated, the bladder being directly supported at its outer end on a reduced diameter cylindrical support drum provides additional clearance, in relation to known bladder turn-ups, for the plied down fabric furs or ruffles seen at 80 due to cord crowding and eliminates wrinkle problems commonly associated with the use of spring fingers. That is, the radial spacing between the inner diameter of the closed spring fingers and outer diamter of the deflated bladder is selected to accommodate furling of the ply edge. Since such furling or waviness usually will be greatest at the distal end of the ply edge, preferably the bladder is supported at its axially inner portion in a somewhat conical form as seen in FIG. 4.

After the ply edge has been turned down and the bead 77 set in place, the ring device 30 and ply-down assembly 29 are indexed axially outwardly to retracted positions clearing the turn-up mechanism 28. At this time, air is supplied to the bladder 42 to expand the same from its original rest condition seen in FIG. 4 through the progressive stages of inflation seen in FIGS. 5–7. As the bladder inflates from its FIG. 4 condition, the ply edge is progressively wrapped tightly around the radially inner side of the bead and turned upwardly.

After the bladder attains maximum height or full pressure and with the bladder locked to the inside of the bead as seen in FIG. 7, the ring device 30 and ply-down assembly 29 once again are axially inwardly advanced to contact the control ring 76 with the bladder. Once the control ring has contacted the bladder as seen in FIG. 7, developed pressure in the bladder is reduced and thereafter held at reduced pressure positively to lock the bladder to the control ring against any slippage at the contact point as the control ring forces the bladder to wrap around the tire bead and roll over the drum thereby to continue progressive wrapping of the ply edge around the bead and then over the drum. Prevention against slippage is necessary to ensure proper roll over and wrapping pressure. It is noted however that pressure reduction may not be necessary in machines employing ring device actuators 62 which are capable of generating high pushing forces.

Figure 8:
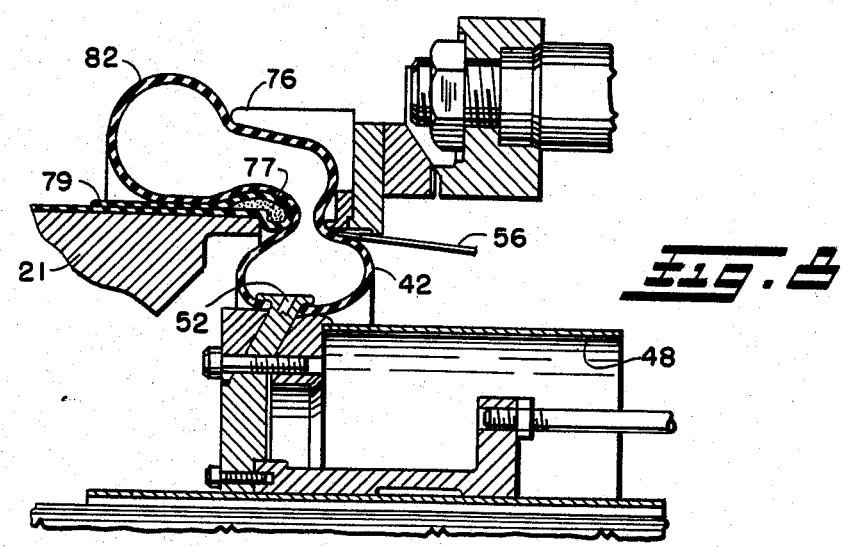
Figure 9:
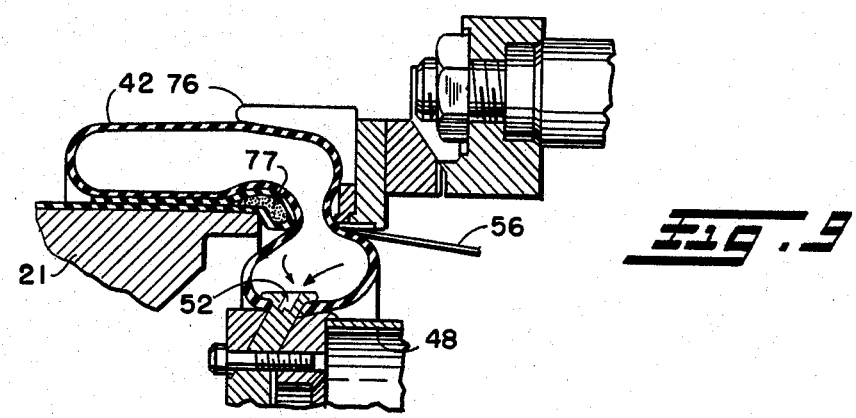
Figure 10:
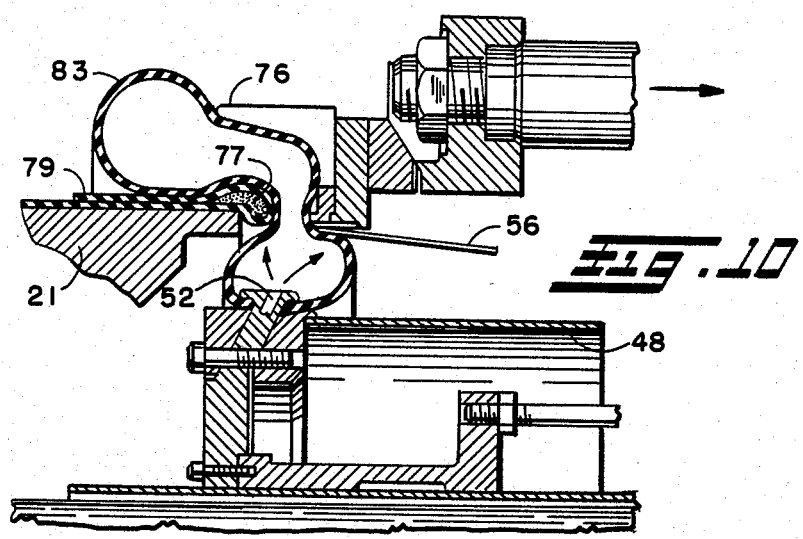

After the control ring 76 reaches its axially inner position shown in FIG. 8, the axially inner end portion of the thusly rolled bladder will have bulged radially outwardly in front of the control ring when at the intermediate bladder pressure as seen at 82 in FIG. 8, such control ring radially restraining the bladder over an intermediate portion thereof overlying the bead and drum. As a result of such bulge, the bladder may not be in pressed engagement with the distal end of a long ply edge as seen in FIG. 8. In order to complete progressive rolling of the bladder over the drum in such instance to its condition seen in FIG. 9, the bladder is further deflated to a relatively low air pressure. This obtains maximum ply lock with low pressure sustained in the bladder then in the condition seen in FIG. 9. The bladder turn-up cycle may then be completed by simultaneously reinflating the bladder and retracting the control ring and finger ply-down assembly 29. Upon reinflation, the bladder once again bulges inwardly of the now retracting control ring as seen at 83 in FIG. 10 but only temporarily to move the bladder out of contact with the distal end of the ply edge. The amount of reinflation normally will be dependent on the distance the bladder has been allowed to roll over the drum and such reinflation is particularly important to prevent the bladder from undoing what it previously had done as it later is deflated. Such inflation, however, would not be necessary in those instances where the bladder is not previously deflated to a relatively low air pressure.

Finally, the bladder is fully deflated, the turn-up mechanism retracted away from the tire building drum, and then the drum radially contracted to permit removal of the now finished tire ply band. Once the tire ply band is removed, the foregoing operational sequence can be repeated to construct a new tire ply band.

Although the invention has been shown and described with respect to a preferred embodiment, it is obvious that equivalent alternations and modifications will occur to others skilled in the art upon the reading and understanding of this specification. The present invention includes all such equivalent alterations and modifications, and is limited only by the scope of the following claims.

I claim:

1. A method of building a tire ply band including the steps of forming an annular band of ply material on a tire building drum with at least one edge thereof extending axially beyond an end of the drum, placing a tire bead at the end of the drum with ply material interposed between the bead and the drum, charcterized by:

axially positioning an annular array of ply-down fingers radially outwardly of the ply edge and then radially inwardly actuating the ply-down fingers to turn the ply edge down over the end of the drum prior to bead placement;

inflating an annular bladder radially underlying the ply edge adjacent the drum end to wrap progressively and turn upwardly the ply edge around the tire bead; and then axially inwardly pushing a portion of the bladder by a rigid axially inwardly advancing bladder control ring to force the bladder to wrap around the bead and roll over the drum thereby to continue progressive wrapping of the ply edge around the bead and then over the drum; and further characterized by the control ring being incorporated in an axially movable ring mechanism, and the steps of axially advancing the ring mechanism toward the drum first to actuate the ply-down fingers and then to set the tire bead carried thereby against the turned down ply edge at the end of the drum, then axially retracting the ring mechanism to clear the bladder prior to inflation, and then axially advancing the ring mechanism toward the drum to effect the aforesaid axially inward pushing of the bladder by the control ring.

2. A method as set forth in claim 1, wherein the control ring has an annular radial pusher surface terminating in a generally axially extending, cylindrical surface operative to rigidly radially constrain the bladder over a portion thereof overlying the bead and drum and behined a radially outwardly bulged, axially inner end portion of the thusly rolled bladder, and further comprising the step of reducing the pressure in the bladder after the control ring contacts the bladder to facilitate the aforesaid wrapping and rolling of the bladder.

3. A method as set forth in claim 2, further comprising the step of reinflating the bladder while simultaneously retracting the control ring after the bladder has been rolled over the drum.

4. A method as set forth in claim 1, including the step of axially positioning the bladder with its axially inner edge located radially and axially inwardly of the rum end prior to application of ply material onto the drum, such bladder being so supported that it is radially inwardly offset from the outer diameter of the drum by an amount accomodating furling of the ply edge resulting from the ply-down operation.

5. A method as set forth in claim 4, including the step of axially retracting the bladder to permit radial contraction of the drum for removal of a finished ply band.

6. A method as set forth in claim 1, wherein no slippage occurs at the initial contact point between the bladder and bladder control ring during inward pushing of the bladder.

7. A method as set fourth in claim 1, wherein the bladder control ring has an annular radial pusher surface and a generally cylindrical surface radially outwardly of and extending axially inwardly from the radial pusher surface, and the pushing step includes initially engaging the inner end of the pusher ring against the bladder when inflated at a point substantially below the inflated height of the bladder and then forcing the bladder to wrap around the bead and roll over the drum to continue wrapping of the ply edge around the bead and then over the drum with no appreciable slippage occurring between the bladder and the control ring at such initial point of contact.

8. A method as set forth in claim 7, wherein the inner end of the control ring is relatively narrow in relation to the inflated height of the bladder.

9. A method as set forth in claim 7, wherein the generally cylindrical, axially inwardly extending surface of the control ring operates to rigidly radially constrain the bladder over a portion thereof overlying the bead and drum as the bladder is rolled over the drum.

10. A method as set forth in claim 7, further comprising the step of reducing developed pressure in the bladder after the control ring contacts the bladder.

11. A method as set forth in claim 7, further comprising the step of axially positioning the bladder with its axially inner end portion located beneath the full axial extend of the place bead.

* * * * *